US007893862B2

(12) United States Patent
Holly et al.

(10) Patent No.: US 7,893,862 B2
(45) Date of Patent: Feb. 22, 2011

(54) METHOD AND APPARATUS FOR USING COLLIMATED AND LINEARLY POLARIZED MILLIMETER WAVE BEAMS AT BREWSTER'S ANGLE OF INCIDENCE IN GROUND PENETRATING RADAR TO DETECT OBJECTS LOCATED IN THE GROUND

(75) Inventors: Sandor Holly, Woodland Hills, CA (US); Nicholas Koumvakalis, Thousand Oaks, CA (US); Robert Alan Smith, Hampton Cove, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/167,753

(22) Filed: Jul. 3, 2008

(65) Prior Publication Data

US 2009/0040093 A1 Feb. 12, 2009

Related U.S. Application Data

(63) Continuation-in-part of application No. 11/758,785, filed on Jun. 6, 2007.

(51) Int. Cl.
 *G01S 13/04* (2006.01)
 *G01S 13/88* (2006.01)
 *G01V 3/12* (2006.01)
 *G01S 13/00* (2006.01)
 *G01V 3/00* (2006.01)
(52) U.S. Cl. .............................. 342/22; 342/27; 342/59; 342/82; 342/89; 342/175; 342/188; 342/195
(58) Field of Classification Search .................. 342/21, 342/22, 27, 28, 59, 82, 89, 175, 188–197, 342/118, 134–145
See application file for complete search history.

(56) References Cited

U.S. PATENT DOCUMENTS 3,745,575 A * 7/1973 Kikuchi ...................... 342/22

(Continued)

FOREIGN PATENT DOCUMENTS

WO        0077614 A    12/2000

(Continued)

OTHER PUBLICATIONS

U.S. Appl. No. 11/393,386, filed Mar. 30, 2006, Schultz et al.

(Continued)

*Primary Examiner*—Bernarr E Gregory
(74) *Attorney, Agent, or Firm*—Yee & Associates, P.C.; Baldwin D. Quan

(57) ABSTRACT

A detection system comprises a transmitter unit, a receiver, and a processor. The transmitter unit is capable of transmitting a first collimated beam having a first frequency and a second collimated beam having a second frequency into a ground, wherein the first collimated beam and the second collimated beam overlap in the ground. The receiver is capable of monitoring for a response radio frequency signal having a frequency equal to a difference between the first frequency and the second frequency. The response radio frequency signal is generated by an object having non-linear conductive characteristics in response to receiving the first collimated beam and the second collimated beam. The processor is capable of controlling an operation of the transmitter unit and the receiver. The processor is connected to the transmitter unit and the receiver. The object is detected when the response radio frequency signal is detected by the receiver.

20 Claims, 8 Drawing Sheets

U.S. PATENT DOCUMENTS

| | | |
|---|---|---|
| 5,668,342 A | 9/1997 | Discher |
| 5,900,833 A | 5/1999 | Sunlin et al. |
| 6,057,765 A | 5/2000 | Jones et al. |
| 6,094,157 A * | 7/2000 | Cowdrick .................... 342/22 |
| 6,163,259 A | 12/2000 | Barsumian et al. |
| 6,501,414 B2 * | 12/2002 | Arndt et al. .................... 342/22 |
| 6,522,285 B2 * | 2/2003 | Stolarczyk et al. ............ 342/22 |
| 6,864,825 B2 | 3/2005 | Holly |
| 6,897,777 B2 | 5/2005 | Holmes et al. |
| 6,943,742 B2 | 9/2005 | Holly |
| 6,950,076 B2 | 9/2005 | Holly |
| 6,999,041 B2 | 2/2006 | Holly |
| 7,009,575 B2 | 3/2006 | Holly et al. |
| 7,130,624 B1 | 10/2006 | Jackson et al. |
| 7,142,147 B2 | 11/2006 | Holly |
| 7,190,302 B2 * | 3/2007 | Biggs .......................... 342/22 |
| 7,473,898 B2 | 1/2009 | Holly et al. |
| 7,512,511 B1 | 3/2009 | Schultz et al. |
| 7,528,762 B2 * | 5/2009 | Cerwin ........................ 342/22 |
| 2002/0011947 A1 * | 1/2002 | Stolarczyk et al. ............ 342/22 |
| 2002/0111720 A1 | 8/2002 | Holst et al. |
| 2002/0175849 A1 * | 11/2002 | Arndt et al. .................... 342/22 |
| 2003/0028899 A1 | 2/2003 | MacInnis |
| 2003/0041236 A1 | 2/2003 | Nestoryak |
| 2005/0062639 A1 * | 3/2005 | Biggs .......................... 342/22 |
| 2005/0064922 A1 | 3/2005 | Owens et al. |
| 2005/0200550 A1 | 9/2005 | Vetrovec et al. |
| 2006/0082488 A1 | 4/2006 | Keller |
| 2007/0013577 A1 | 1/2007 | Schnitzer et al. |
| 2007/0024489 A1 * | 2/2007 | Cerwin ........................ 342/22 |
| 2007/0046791 A1 | 3/2007 | Wang et al. |
| 2008/0092518 A1 | 4/2008 | Winkler et al. |
| 2008/0127171 A1 | 5/2008 | Tarassov |
| 2008/0127175 A1 | 5/2008 | Naranjo et al. |
| 2009/0040093 A1 | 2/2009 | Holly et al. |
| 2009/0198393 A1 | 8/2009 | Sims, III et al. |
| 2009/0198712 A1 | 8/2009 | Sims, III et al. |

FOREIGN PATENT DOCUMENTS

WO      2006110991 A      10/2006

OTHER PUBLICATIONS

U.S. Appl. No. 12/412,919, filed Mar. 27, 2009, Holly et al.
Wilson et al., "Improvised Explosive Devices (IEDs) in Iraq and Afghanistan: Effects and Countermeasures", CRS Report for Congress, updated Nov. 21, 2007, pp. 1-6.
U.S. Appl. No. 11/158,787, filed Jun. 6, 2007.
U.S. Appl. No. 12/504,293, filed Jul. 16, 2009, Holly et al.
U.S. Appl. No. 12/481,941, filed Jun. 10, 2009, Burns et al.
U.S. Appl. No. 11/758,785, filed Jun. 6, 2007, Holly et al.

* cited by examiner

METHOD AND APPARATUS FOR USING COLLIMATED AND LINEARLY POLARIZED MILLIMETER WAVE BEAMS AT BREWSTER'S ANGLE OF INCIDENCE IN GROUND PENETRATING RADAR TO DETECT OBJECTS LOCATED IN THE GROUND

CROSS REFERENCE TO RELATED APPLICATION

The present invention is a continuation-in-part (CIP) of the following patent application: entitled "Method and Apparatus for Using Non-Linear Ground Penetrating Radar to Detect Objects Located in the Ground", Ser. No. 11/758,785, filed Jun. 6, 2007, and incorporated herein by reference. The present invention is also related to the following patent application: entitled "Method and Apparatus for Locating Objects Using Radio Frequency Identification", Ser. No. 11/758,787, filed Jun. 6, 2007, and incorporated herein by reference.

BACKGROUND INFORMATION

1. Field

The present invention relates generally to improved method and apparatus for identifying objects. Still more particularly, the present invention relates to a method and apparatus for detecting objects located in the ground using electromagnetic radiation.

2. Background

An increasing demand is present for an approach to detect and locate tunnels, underground infrastructure, and for identifying objects located within the ground. A threat is posed by tunneling. Tunnels may be deeply bored. Deep urban bunkers with interconnecting tunnels also may be present. These types of tunnels are often used to smuggle illegal contraband into and out of a country. Many of these facilities are deeply buried or significantly hardened in an attempt to preclude detection and characterization by sensors.

Various approaches that have been considered for detecting tunnels include electromagnetic and gravity gradiometry, thermal, seismic, or other nondestructive and noninvasive investigations. These approaches have been used by active and passive systems through unattended ground vehicles and unmanned aerial vehicles, as well as other land mobile platforms as mountings for these types of sensors. Invasive techniques that have been used include drilling techniques for tunnel detection and verification. With respect to detecting tunnels at different ranges, a need has developed for detecting near surface tunnels. These types of tunnels typically have a depth range anywhere between a few feet to a hundred feet or more under the surface. Currently available techniques do not have the depth range and resolution needed to detect tunnels at the deeper end of this depth range.

SUMMARY

The advantageous embodiments provide a method and apparatus for detecting objects having electrical non-linear characteristics located underground. In one advantageous embodiment, the detection system comprises a transmitter unit, a receiver, and a processor. The transmitter unit is capable of transmitting a first collimated beam having a first frequency and a second collimated beam having a second frequency into a ground, wherein the first collimated beam and the second collimated beam overlap in the ground. The receiver is capable of monitoring for a response radio frequency signal having a frequency equal to a difference between the first frequency and the second frequency. The response radio frequency signal is generated by an object having non-linear conductive characteristics in response to receiving the first collimated beam and the second collimated beam. The processor is capable of controlling an operation of the transmitter unit and the receiver. The processor is connected to the transmitter unit and the receiver, and wherein the object is detected when the response radio frequency signal is detected by the receiver.

In another advantageous embodiment, an apparatus comprises a transmitter unit and a receiver. The transmitter unit is capable of transmitting a first collimated beam that is linearly polarized and having a first frequency and a second collimated beam that is linearly polarized and having a second frequency into a ground at an angle at which reflection of the first collimated beam and the second collimated beam is reduced. The receiver is capable of monitoring for an electromagnetic signal having a frequency equal to a difference between the first frequency and the second frequency in which the frequency is generated by an object having an electrical non-linear conductive characteristic in response to being exposed to the first collimated beam and the second collimated beam. The object is detected when the electromagnetic signal is detected by the receiver.

In a different advantageous embodiment, a method is used to detect an object with electrical non-linear characteristics. A first collimated beam and a second collimated beam are transmitted into a ground at an angle at which reflection of the first collimated beam and the second collimated beam is reduced, wherein the first collimated beam is linearly polarized and has a first frequency. The second collimated beam is linearly polarized and has a second frequency. The first collimated beam and the collimated second beam overlap each other in the ground. An electromagnetic signal is monitored for having a frequency equal to a difference between the first frequency and the second frequency, wherein the electromagnetic signal is generated by an object in the ground having an electrical non-linear characteristic in response to being exposed to the first collimated beam and the second collimated beam. The object is detected having the electrical non-linear characteristic when the electromagnetic signal is detected.

The features, functions, and advantages can be achieved independently in various embodiments or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment when read in conjunction with the accompanying drawings, wherein:

DETAILED DESCRIPTION

Figure 1:
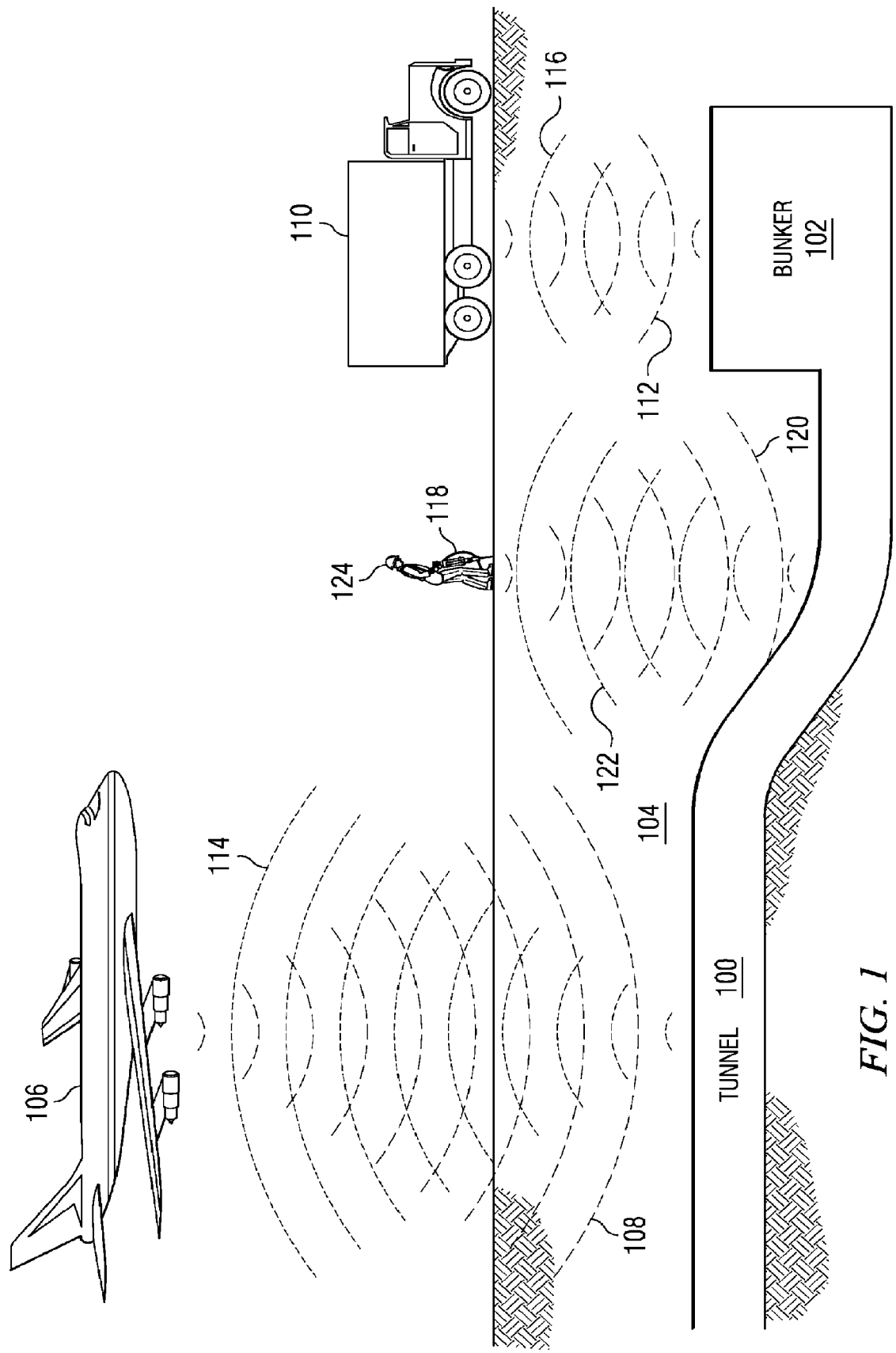
FIG. 1 is a diagram illustrating a method and apparatus for detecting structures buried under the ground in accordance with an advantageous embodiment.

With reference now to the figures and in particular with reference to FIG. 1, a diagram illustrating a method and apparatus for detecting structures buried under the ground is depicted in accordance with an advantageous embodiment. In these illustrative examples, non-linear ground penetrating radar technology is used to detect objects, such as tunnels and bunkers.

In the depicted example, electromagnetic pulses are launched into the ground and echoes from an underground object are received and interpreted in an attempt to identify the object. The different illustrative embodiments recognize that a problem with this current method of using ground penetrating radar is that finding an appropriate radio frequency to operate the system is often difficult. The different embodiments recognize that this difficulty lies in the contradictory capabilities and limitations of low and high frequencies.

The different advantageous embodiments recognize that electromagnetic techniques in which electromagnetic pulses are launched into the ground have been used. Echoes from underground objects or discontinuities are received and interpreted. This technique is referred to as a ground penetrating radar and has been used in the past to detect various underground discontinuities, such as cables, pipes, cavities, and other objects intoned or buried deeply in ice or other formations.

The different advantageous embodiments also recognize that one of the challenges with the currently used ground penetrating radar methods is to find an appropriate frequency of operation. Often times, the frequencies either do not exist or are not available. With respect to available frequencies, if a frequency of operation is chosen to be too low, the available resolution is poor, making results unusable. These types of frequencies are usually less than 10 MHz.

If the selected frequency is too high, the available pulse penetration depth suffers. In other words, higher frequencies do not penetrate into the ground as far. A high frequency is typically considered a frequency greater than 1 GHz. As a result, high frequency ground penetrating radars are typically only used in applications in which objects are located in shallow depths, such as inches rather than feet.

Thus, the different advantageous embodiments provide an improved ground penetrating radar technique. This technique is based on electrical non-linear characteristics of objects, such as surfaces of corroded conducting objects that are located in the ground. The technique also may be based on corroded objects located in underground tunnels. In these examples, a corroded conductive object may be oxidized or rusted. The corrosion causes a conductive non-linearity in a shallow layer on the surface of a conducting object.

The corroded or oxidized portion has a different conductivity than the non-corroded portion. This technique also may be applied to other electrical non-linear characteristics of objects. For example, if an object contains two different types of metals in layers, this non-linearity also may be used to detect the object located under the ground. Another example may be discarded electronic circuits with non-linear components, such as diodes or transistors, embedded in them.

The different advantageous embodiments provide a system for detecting underground objects, such as tunnel 100 and bunker 102 within ground 104. These and other types of objects may be detected based on electrical non-linear characteristics of these objects. This non-linearity is typically found in corroded conducting elements within tunnel 100 and bunker 102. These elements also may be located as objects within tunnel 100 or bunker 102. Alternatively, these elements may be part of the infrastructure making up tunnel 100, bunker 102 or electronic equipment.

In these illustrative examples, pulsed electromagnetic fields are sent into ground 104. Aircraft 106 is an example of a source for electromagnetic signals 108. Truck 110 is a source of electromagnetic signals 112.

When electromagnetic signals 108 encounter an object that has electrical non-linear characteristics, currents are induced during the duration of these pulses. Any non-linearity within the object results in some of these currents being converted to or rectified into currents oscillating at the difference frequency between the frequencies of the two pulsed signals.

These difference currents then reradiate as electromagnetic radiation at the difference frequency. Some of these signals propagate back towards the surface as response signals 114. Response signals 114 may be detected by a receiver in aircraft 106 to identify the presence of a buried object, such as tunnel 100. The receiver in aircraft 106 is set to detect signals at the difference frequency. In a similar fashion, when truck 110 transmits electromagnetic signals 112, a portion of bunker 102 containing a non-linear conductive section generates response signals 116 at the difference frequency. In these examples, electromagnetic signals 112 are in the form of pulsed electromagnetic radiation.

In yet another embodiment, portable instrument 118 may be employed to generate electromagnetic signals 120, which cause currents to occur in a non-linear conductive section within tunnel 100. As a result, some of these currents generate response signals 122, which are radiated back to portable instrument 118. In this type of embodiment, portable instrument 118 may be moved and positioned by person 124. With this type of implementation, portable instrument 118 is carried by person 124 and periodically placed on the ground 104.

The receivers in aircraft 106 and truck 110 are insensitive to the outgoing signals in these examples. This insensitivity occurs, in the depicted examples, because the receiver operates at a much lower frequency, which is not related harmonically to either of the two transmitted frequencies. As a result, the background noise is essentially eliminated or greatly reduced. Further, higher power transmitted pulses may be emitted without having to worry about these pulses coupling into sensitive receiver circuits and blinding the receiver.

Another benefit, in many of the embodiments, is that the response generated by the buried objects in ground 104, such as tunnel 100 and bunker 102, travel only one way. Response signals 114, 116 and 122 travel toward the receiver. As a result, unwanted signals occurring from echoes created by irrelevant strata or layers in the soil, encountered by the outgoing signals, are eliminated. Also, echoes created by shallow lying trash in the soil are eliminated.

In these examples, two transmitting antennas are used in which each antenna is tuned or selected to transmit a different frequency from the other antenna. The different frequencies are generated by a transmitter unit. The different frequencies are used to create a difference frequency within the desired frequency range. This difference frequency is in the range of frequencies detected by the receiver in these examples. In these examples, the difference frequency is equal to the difference between the first frequency and the second frequency. The first frequency is at higher frequency than the second frequency in these examples.

In one embodiment, pulsed electromagnetic signals of both frequencies enter the ground and propagate until these signals encounter a conductive object in which currents are induced. The currents are induced during the duration of the electromagnetic pulses. If the object contains a component with an electrical non-linear characteristic, such as a corroded or rusted surface, some of these induced currents are converted to currents that oscillate at the difference frequency.

The currents then re-radiate electromagnetic signals at the difference frequency. A portion of the signal propagates back towards the surface and is captured as a response signal by the receiving antenna. A receiver connected to the receiving antenna is specifically tuned to the difference frequency. The received difference frequency signals are then interpreted.

One advantage of using this type of ground penetrating radar system is that the receiver is insensitive to outgoing transmitted electromagnetic signals because the receiver operates at a much lower frequency. This frequency is selected to be unrelated to the frequencies of the transmitted signal.

Therefore, background noise is greatly diminished with this type of system. Additionally, higher intensity transmitted pulses may be emitted without having to worry about these high power outgoing pulses coupling into sensitive receiver circuits and blinding the receiver. Another benefit of the different advantageous embodiments is that a received signal at the difference frequency travels only one way. The path that the signal travels is from the object to the surface. This type of propagation eliminates most unwanted signals that may occur due to echoes created by irrelevant strata or layers in the soil that may be encountered as the outgoing transmitter pulses enter the soil.

Figure 2:
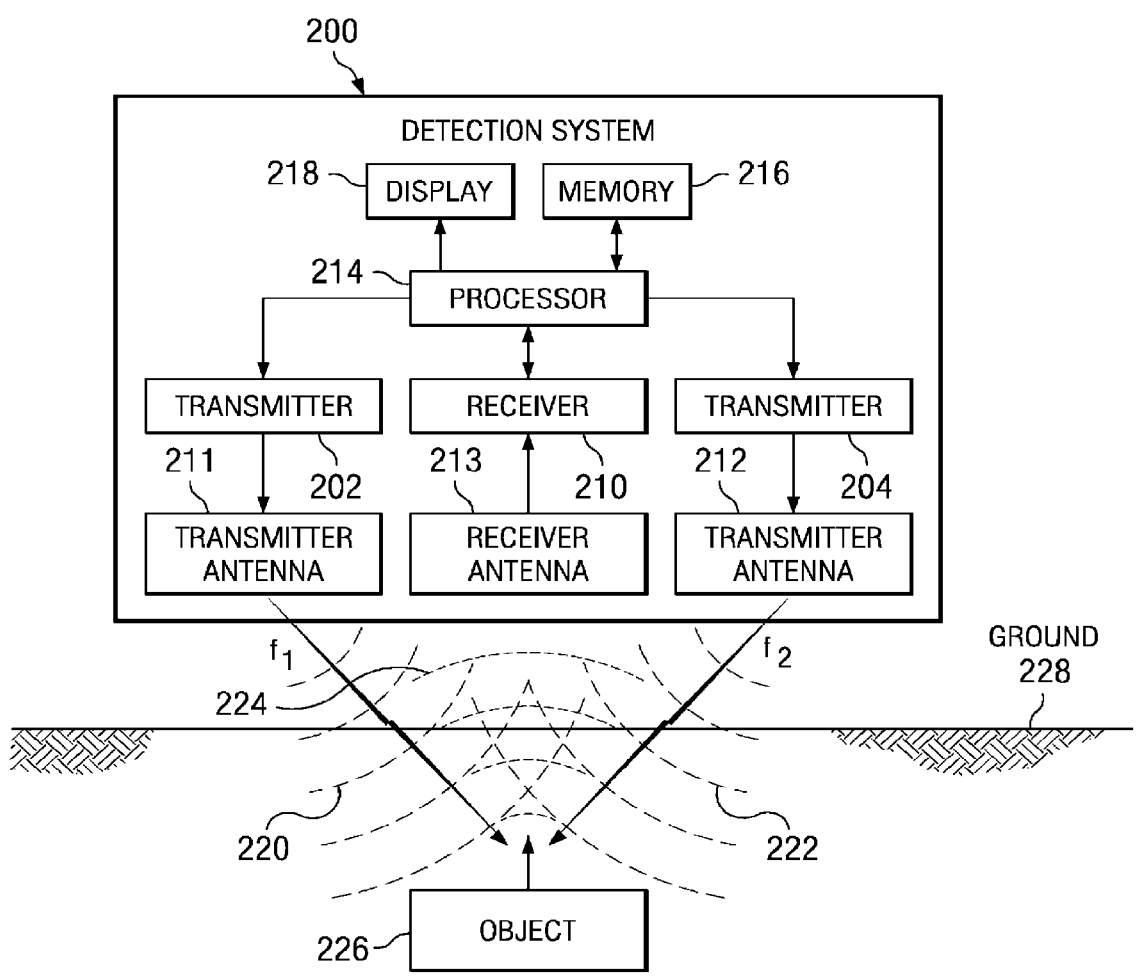
FIG. 2 is a diagram of a detection system in accordance with an advantageous embodiment.

Turning now to FIG. 2, a block diagram of a detection system is depicted in accordance with an advantageous embodiment. In this example, detection system 200 is an example of an apparatus that may be implemented for detecting objects having electrical non-linear characteristics that are buried under the ground. In particular, detection system 200 may be implemented or located in a vehicle, such as, for example, aircraft 106 or truck 110 in FIG. 1. Also, detection system 200 may be implemented as a portable instrument.

In this example, detection system 200 includes transmitter 202, transmitter 204, and receiver 210. Detection system 200 also includes antenna 211, antenna 212 and antenna 213. Processor 214, memory 216 and display 218 also are located in detection system 200.

Transmitter 202 and transmitter 204 form a transmitter unit that generates electromagnetic signals at different frequencies.

Antennas 211 and 212 receive electromagnetic energy from transmitters 202 and 204, respectively, and radiate the electromagnetic energy as electromagnetic signals 220 and 222. Depending on the implementation, a single antenna may be used in place of antennas 211 and 212. Transmitters 202 and 204 may be designed to share a single antenna in this type of implementation. In these examples, electromagnetic signals 220 and 222 take the form of electromagnetic radiation emitted as pulses. Response signals 224 collected by antenna 213 are routed to receiver 210. Receiver 210 filters and amplifies response signals 224 for further processing. This processing may include interpretation, storage, and display data for response signals 224.

In these examples, transmitter 202 and transmitter 204 may generate electromagnetic signals 220 and 222 having different frequencies. For example, transmitter 202 may generate electromagnetic signals 220 that are emitted by antenna 211 with the first frequency f1. Transmitter 204 may generate electromagnetic signals 222 that are emitted by antenna 212 with a second frequency f2.

The frequencies at which transmitters 202 and 204 generate electromagnetic signals 220 and 222 are controlled by processor 214 in these examples. Processor 214 acts as a controller to generate pulses for electromagnetic signals 220 and 222 in these examples. Processor 214 controls the timings of the leading edges of the emitted pulses and the timing of the leading edge of the received pulses. Information about the received pulse-widths may be used to help determine the resonant nature (the Q) of electrically non-linear objects.

In these embodiments, the pulse widths of the received signals in response signals 224 will have to be referred to (compared to) the pulse widths of the outgoing (transmitted) pulses. Processor 214 may perform these and other operations based on instructions stored in memory 216. Response signals 224 received by receiver 210 may be displayed on display 218. Further, display 218 may also provide other information, such as the range or location of a response identified by receiver 210. Display 214 is also used to display cross-sections in depth of the soil as traversed on the surface along a normally straight line.

In these advantageous embodiments, processor 214 identifies a frequency at which a response is desired to be detected by receiver 210. Processor 214 sets receiver 210 to detect signals at this identified frequency. Processor 214 sets transmitter 202 to transmit electromagnetic signals 220 at a first frequency f1. Transmitter 204 is set by processor 214 to transmit electromagnetic signals 222 at a second frequency f2. In other embodiments, the frequencies transmitted by transmitters 202 and 204 are fixed and not changed or controlled by processor 214.

The difference between the first frequency f1 and second frequency f2 is equal to a difference frequency that is set for receiver 210 in these examples. The frequency selected for transmitters 202 and 204 are such that they do not affect the electronics in receiver 210. Receiver 210 is not configured or programmed to detect signals at the frequencies set for transmitters 202 and 204.

As an example, transmitter 202 may be set to transmit at 94 MHz while transmitter 204 is set to transmit at 106 MHz The difference between these two frequencies is 12 MHz Receiver 210 is set to detect signals at the 12 MHz frequency.

With these frequencies, the typical penetration depth into the ground at output power levels currently used with conventional ground penetrating radar systems is approximately 60 to 100 feet. In these examples, object 226 is located under ground 228. Object 226 contains electrical non-linear characteristics. All or a portion of object 226 may contain these characteristics in these examples.

When electromagnetic signals 220 and 222 reach object 226, currents are induced within all conductive parts of object 226. Some of these induced currents will convert to currents with difference frequency, Δf in portions of the conductive parts of object 226 with non-linear characteristics. These currents, with frequency Δf, result in the generation of an electromagnetic signal in the form of response signals 224. Response signals 224 are captured by antenna 210 in these examples.

Receiver 210 detects response signal 224 and sends this data to processor 214 for processing and analysis. In these examples, receiver 210 does not detect electromagnetic signals 220 and 222 because receiver 210 is set only to detect a frequency that is the difference between the frequency transmitted by transmitter 202 and the frequency transmitted by transmitter 204.

The electrical non-linear characteristics may be found in objects, such as, for example, oil, gas, and water pipelines. Other examples of objects that may have non-linear elements that are buried include fuel tanks, water tanks, and cables. Electrical non-linearities may be present in these objects due to corrosion in a metallic portion of the object. The electrical non-linear characteristic within the object causes a response signal that has a frequency equal to the difference between the two transmitted signals to be returned. This response is detected by receiver 210 in this example.

In these examples, the penetration of electromagnetic signals 220 and 222 increases as the frequencies used decrease. Resolution, however, decreases as well, as the frequencies decrease. More specifically, the spatial resolution decreases. In this illustrative example, transmitter 202 and transmitter 204 may continuously transmit at frequencies f1 and f2. With this type of operation, receiver 210 detects only the frequency that is the difference between those two frequencies.

As a result, response signals 224, when detected by receiver 210, is processed by processor 214 indicating the presence of object 226 under ground 228. Further, with the movement of detection system 200 in a horizontal direction relative to the surface of ground 228, the shape of object 226 may be identified through continued detection of response signals 224. The change in time at which response signals 224 is received as detection system 200 moves may be used to determine the shape and depth of object 226. This information may be stored by processor 214 and memory 216 as readings together with location (position) readings are taken by detection system 200. The data stored in memory 216 may be processed by processor 214 to generate an image of object 226 under ground 228 and present it on display 218. This image may be a vertical cross section.

Alternatively, processor 214 may set receiver 210 to detect signals within a range of difference frequencies. In this manner, if additional objects in addition to object 226 are located under ground 228 with different electrical non-linear characteristics at various different depths, these objects also may be detected by detection unit system 200.

The different advantageous embodiments may transmit electromagnetic signals 220 and 222 using different frequencies. The different advantageous embodiments recognize that under certain conditions with higher frequency transmissions, large amounts of energy in electromagnetic signals 220 and 222 may be lost. For example, when the ground has a dielectric constant of around nine, and radio frequency signals are sent at a normal angle of incidence, around 64 percent of the incident radiation may be lost. The dielectric constant nine may occur with wet soil, water, or other suitable ground conditions. The different advantageous embodiments recognize that the use of higher frequencies may overcome some of these problems.

For example, frequencies around 75 GHz to around 100 GHz may be used. Of course, other frequency ranges also may be employed depending on the particular implementation. In these examples, a 100 GHz frequency may result in a three millimeter wave length, while 75 GHz may result in a four millimeter wave length.

Further, in the different advantageous embodiments, transmitter 202 and transmitter 204 may generate collimated beams that are transmitted by transmitter antenna 211 and transmitter antenna 212 as a particular implementation or form for electromagnetic signal 220 and electromagnetic signal 222. With this type of implementation, electromagnetic signal 220 and electromagnetic signal 222 may take the form of a beam, in which the beam diameter may be around 20 to 100 times the wave length.

The different advantageous embodiments contemplate that these types of frequencies used with electromagnetic signals 220 and 222 in the form of collimated beams may be used to detect object 226. The depth of object 226 in ground 228 may vary with the type of implementation, depending on the power and the angle at which electromagnetic signal 220 and electromagnetic signal 222 enter the ground. Electromagnetic signal 220 and electromagnetic signal 222 may be linearly polarized in the same direction or angle in these examples.

In these examples, it may be desirable to have both of these signals enter ground 228 at a polarization angle which is also referred to as a Brewster's angle. This angle may be one at which the polarization for electromagnetic signal 220 and electromagnetic signal 222 cannot be reflected by ground 228.

Figure 3:
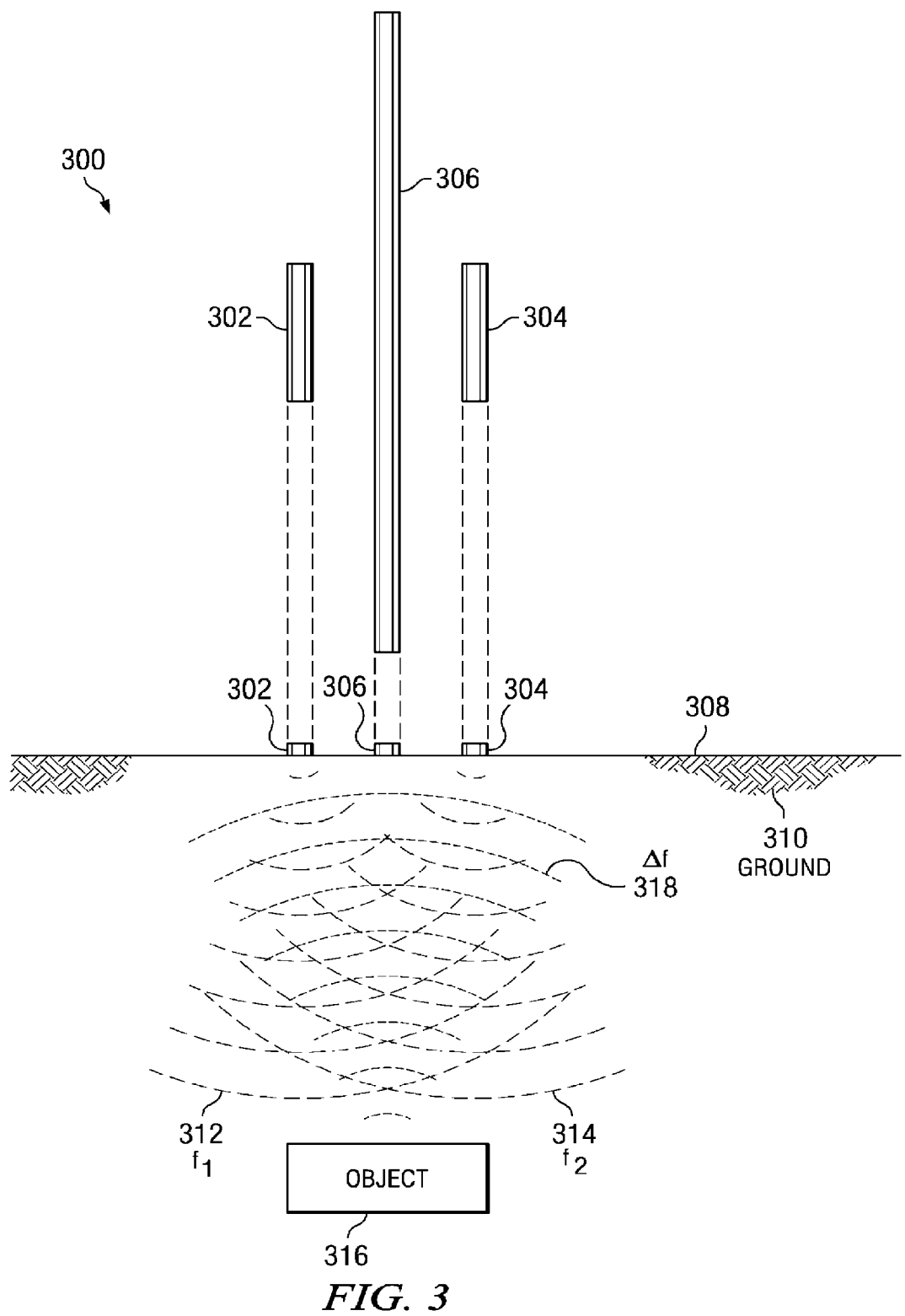
FIG. 3 is a diagram illustrating another configuration for a detection system in accordance with an advantageous embodiment.

With reference now to FIG. 3, a diagram illustrating another configuration for a detection system is depicted in accordance with an advantageous embodiment. Detection system 300 includes transmitter antennas 302 and 304 along with receiver antenna 306. In these examples, transmitter antenna 302 transmits at frequency f1, while transmitter antenna 304 transmits at frequency f2. Receiver antenna 306 is designed to receive frequencies at frequency Δf, which is a frequency having a difference between frequency f1 and frequency f2 for transmitter antennas 302 and 304 in these examples.

In FIG. 3, antennas 302, 304 and 306 are placed on surface 308 of ground 310. Antennas 302 and 304 may transmit electromagnetic signals 312 and 314, at frequencies f1 and f2, respectively.

In this example, object 316 is located under ground 310. Non-linear characteristics in object 316 result in response signals 318, which are detected by receiver antenna 306. Response signals 318 are emitted at the difference frequency Δf.

In these illustrative examples, many ground penetrating radar applications require radio frequency pulses that are at low frequencies and cannot be collimated. This type of situation may occur with many soil types which absorb radiation at an increasing rate starting at frequencies several hundred MHz and higher. With other soil types, such as dry sand and ice, millimeter waves may be used without much absorption. A collimated system, such as that depicted in FIG. 4 shown below, may be implemented.

Detection system 300, in these examples, is especially useful with wet soils in which low transmitter frequencies are required. For this type of configuration for detection system 300, transmitter antennas 302 and 304 may emit signals at or around 200 MHz plus and minus 15 MHz. In these examples, transmitter antennas 302 and 304 are, for example, about one half meter long at each of these frequencies. Receiver antenna 306 may be three to four meters long and operate to receive response signals 318 at around 25-30 MHz in this particular example. Of course, depending on the particular implementation, there is a range of frequencies to choose from.

Figure 4:
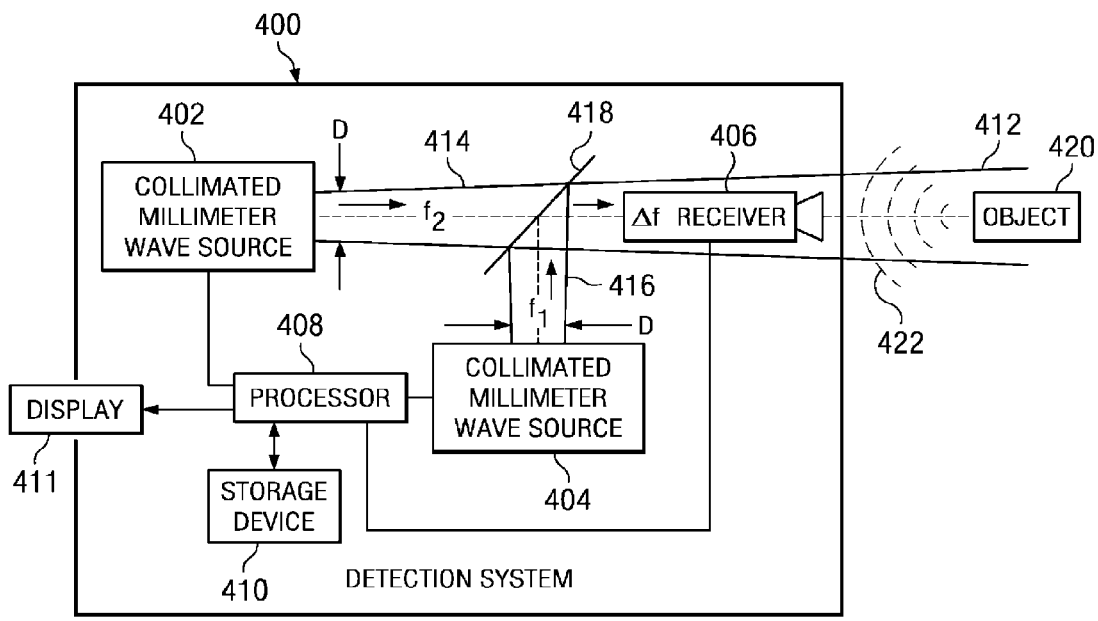
FIG. 4 is a diagram illustrating a detection system in accordance with an advantageous embodiment.

Turning next to FIG. 4, a diagram illustrating a detection system is depicted in accordance with an advantageous embodiment. Detection system 400 is an example of another configuration that may be used in a vehicle, such as aircraft 106 or in truck 110 in FIG. 1.

In this particular example, detection system 400 includes collimated millimeter wave source 402, collimated millimeter wave source 404, and receiver 406. Detection system 400 also includes processor 408, storage device 410, and display 411. This type of implementation may be used in situations when high frequencies, such as frequencies in the 100 GHz range, can be used.

Processor 408 operates to control collimated millimeter wave source 402 and collimated millimeter wave source 404. Further, processor 408 receives data for signals detected by receiver 406. Processor 408 executes instructions that may be located in storage device 410. Results of response signals detected by receiver 406 may be presented on display 411.

In this example, detection system 400 generates electromagnetic signals in the form of a single beam, beam 412. Beam 412 is generated through a combination of beams 414 and 416 which are generated by collimated millimeter wave source 402 and collimated millimeter wave source 404, respectively. Collimated millimeter wave source 404 generates beam 416 with a first frequency f1. Collimated millimeter wave source 402 generates beam 414 with a second frequency f2. These two beams are combined into beam 412 using polarization beam combiner 418.

Beam 412 is in essence a combined circularly polarized beam with an interference difference frequency. This interference difference frequency is the difference between frequency f1 generated by collimated millimeter wave source 404 and frequency f2 generated by collimated millimeter wave source 402. Beam 412 may be directed into the ground in which object 420 is buried. Object 420 includes electrical non-linear characteristics that causes currents at the difference frequency to be induced in object 420.

Electromagnetic signals may be emitted from these currents in the form of response signal 422. Object 420 generates response signal 422 with a frequency that is the difference between frequency f1, generated by collimated millimeter wave source 404 and frequency f2, generated by collimated millimeter wave source 402. This frequency is also referred to as a difference frequency.

Response signal 422 is detected by receiver 406 which sends the information in return signal 422 to processor 408 for processing. Processor 408 may store information received in return signal 422 in storage device 410. Additionally, processor 408 may display this information in display 411 in detection system 400.

In detection system 400, beam 412 is a directed beam that may be used to search an area in the ground that has a radius or diameter for beam 412. As a result, when a signal, such as response signal 422 is received by receiver 406, a user of detection system 400 is able to identify object 420.

The collimated millimeter wave sources used in the radio frequency identification units in FIG. 4 may be implemented using any available collimated millimeter wave source. More general information on these types of wave sources and their configurations may be found in U.S. Pat. No. 6,864,825 B2 to Holly and U.S. Pat. No. 7,142,147 B2 to Holly.

Figure 5:
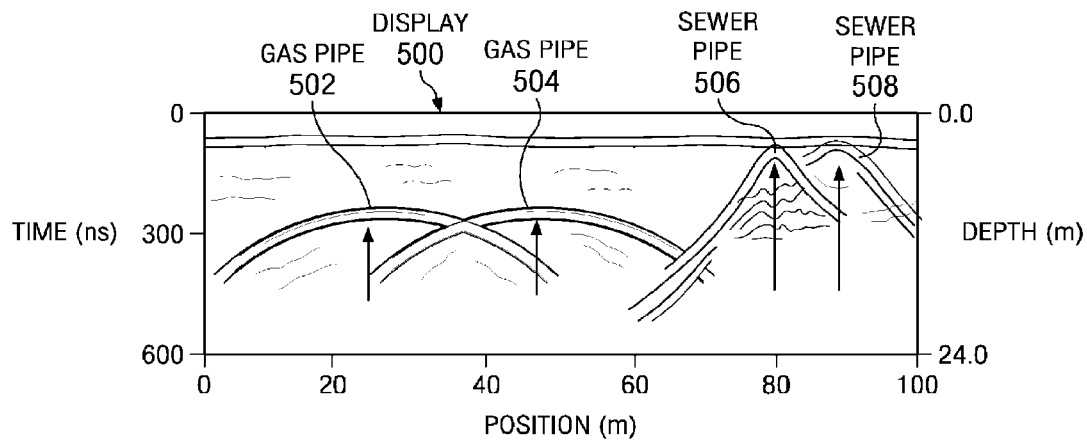
FIG. 5 is a diagram illustrating an example of data obtained using a detection system in accordance with an advantageous embodiment.

Turning now to FIG. 5, a diagram illustrating an example of data that may be obtained using a detection system, such as detection system 200 in FIG. 2 is depicted in accordance with an advantageous embodiment. In this illustrative example, a detection system, such as detection system 200 in FIG. 2 is configured to transmit electromagnetic signals at 185 MHz and 215 MHz. The response signal received is at 30 MHz. Display 500 is generated using the response signals received. Such an image, as an example in display 500, would be generated as detection system 200 moved across the ground. Display 500 is an illustrative example of a characteristic image (a vertical cross-section in the ground) that can be generated using the different processes in the advantageous embodiments.

Within display 500, gas pipe 502 and gas pipe 504 are present. Gas pipe 502 and gas pipe 504 are illustrated in display 500 as a result of signals at □f is received from corroded metal gas pipes in the ground. Further, the depth of these pipes below the ground also can be identified based on the time it took for the electromagnetic pulses to travel roundtrip to the object and back to the receiver antenna. In addition, display 500 also contains shallower objects, such as sewer pipes 506 and 508 in these examples. Other examples of objects that can be detected are an electronic instrument control system, a computer, or communications equipment located below or under the ground. These objects may be located in a tunnel or a bunker in these examples.

Figure 6:
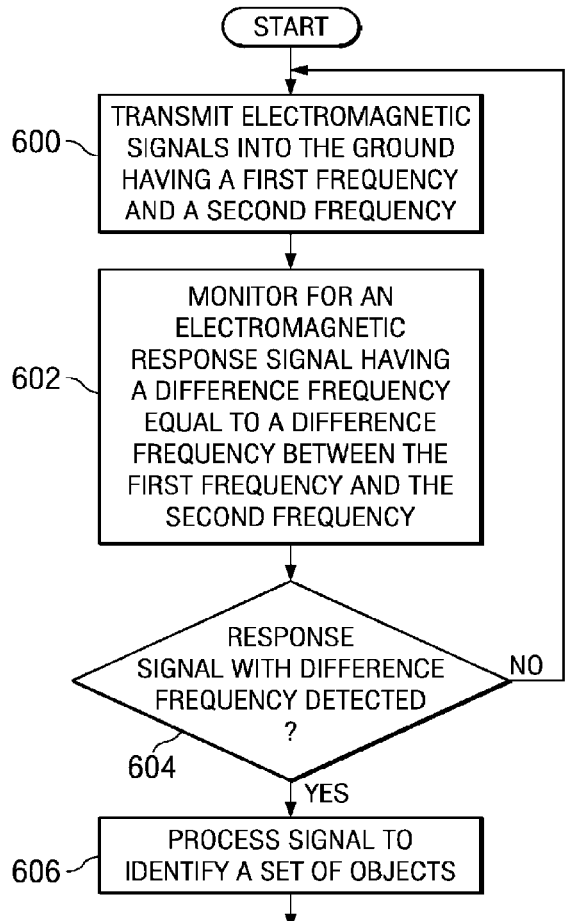
FIG. 6 is a flowchart of the process for detecting an object with electrical non-linear characteristics in accordance with an advantageous embodiment.

With reference now to FIG. 6, a flowchart of a process for detecting an object with electrical non-linear characteristics is depicted in accordance with an advantageous embodiment. The process illustrated in FIG. 6 may be implemented in a detection system, such as detection system 200 in FIG. 2 or detection system 400 in FIG. 4.

The process begins by transmitting electromagnetic signals into the ground in which these signals have a first frequency f1 and a second frequency f2 (operation 600). In these examples, the electromagnetic signals are a continuous stream of electromagnetic pulses originating from two transmitters with carrier frequencies f1 and f2. Thereafter, the process monitors for an electromagnetic response signal having a difference frequency equal to a difference between the first frequency and the second frequency (operation 602). A determination is made as the whether a response signal having the difference frequency is detected (operation 604).

If a response signal with the difference frequency is detected, the signal is processed to identify a set of objects (operation 606). The set of objects may be one or more objects depending on the number of objects in the ground having electrical non-linear characteristics that generate a response signal at a difference frequency. The process terminated thereafter.

With reference again to operation 604, if the response signal is not detected, the process returns to operation 600 as described above.

Figure 7:
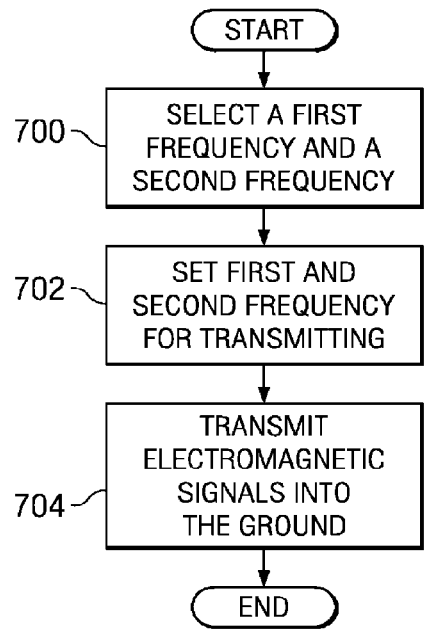
FIG. 7 is a flowchart of a process for transmitting electromagnetic signals in accordance with an advantageous embodiment.

Turning now to FIG. 7, a process for transmitting electromagnetic signals is depicted in accordance with an advantageous embodiment. The process illustrated in FIG. 7 may be implemented in a system, such as detection system 200 in FIG. 2. In particular, the different instructions here may be implemented in a processor, such as processor 214 in FIG. 2.

The process begins by selecting a first frequency f1 and a second frequency f2 (operation 700). These two frequencies are selected in a manner to elicit a response from an object buried in the ground in which an electrical non-linearity is present in the object. The selection of the frequencies for the transmitters varies depending on the application or the implementation.

Typically, in these examples, frequencies between 1 MHz and 1000 MHz are selected. In these particular examples, the transmit frequencies for the first and second frequencies are 94 MHz and 106 MHz. The difference frequency is 12 MHz.

This difference frequency is the frequency at which a response signal is expected if a metallic object with a non-linear feature is present. In other advantageous embodiments, these frequencies may be, for example, from around 75 GHz to 100 GHz or even higher.

As a result, the frequency selected may vary depending on the penetration depth desired for the transmission and response to the transmission of these electromagnetic signals.

Afterwards, the first and second frequencies are set for the transmitters (operation 702). Electromagnetic signals are then transmitted into the ground (operation 704) with the process terminating thereafter. The transmission of these electromagnetic signals may take various forms. For example, they may be in the form of pulses that are repeated. Alternatively, the signals may be transmitted as continuous wave radio frequency signals. The transmission of these signals in operation 704 continues until the process terminates in these examples. These signals may be emitted in the form of collimated beams, in which each of the two selected frequencies is emitted in collimated beams. These collimate beams may overlap to generate the desired response in a difference frequency.

The process illustrated in FIG. 7 may be repeated as often as needed. Further, each time the process is repeated, the first frequency and the second frequency may be changed such that the difference frequency, which is a frequency equal to the difference between the first frequency f1 and the second frequency f2, also changes. This changing of the difference frequency may be used each time the process is repeated to attempt to identify objects under the ground that may have different electrical non-linear characteristics that respond at different frequencies. The process in FIG. 7 may be repeated such that a range of difference frequencies may be detected. If the detection system has fixed frequencies for the transmitters, steps 700 and 702 are omitted and the process only involves transmitting the electromagnetic signals into the ground.

Figure 8:
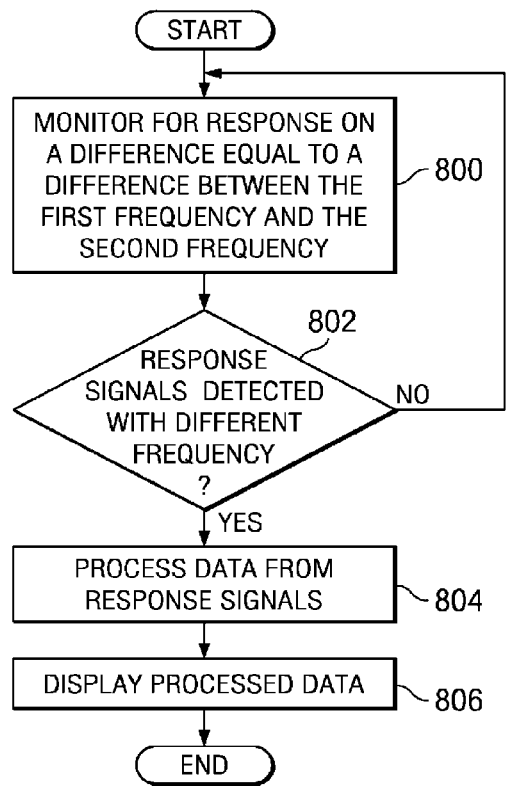
FIG. 8 is a flowchart of a process for detecting a response signal in accordance with an advantageous embodiment.

Turning now to FIG. 8, a flowchart of a process for detecting a response signal is depicted in accordance with an advantageous embodiment. The process illustrated in FIG. 8 may be implemented in a detection system, such as detection system 200 in FIG. 2.

The process monitors for a response on a difference frequency equal to a difference between the first frequency and the second frequency (operation 800). This monitoring is performed using a receiver, such as receiver 210 in FIG. 2. A determination is made as to whether a response signal with the difference frequency is detected (operation 802).

If a response signal is not detected, the process returns to operation 800 to continue to monitor for a difference frequency. As the process loops between operations 800 and 802, the electromagnetic signals continue to be pulsed or emitted as a beam from the detection system.

Alternatively, the vehicle may be stationery or the detection unit may be placed on the ground or a platform for use. If the frequencies set for the transmitter cycle such that the difference frequency changes, operation 800 monitors for the different difference frequencies. In this manner, a range of difference frequencies may be monitored to detect objects that may have different electrical non-linear characteristics.

When a response signal having the difference frequency is detected in operation 802, the data from the response signals is processed (operation 804). This processing may include, for example, identifying the location or depth at which the object is located in the ground. Additionally, the data in the response signals may be processed to generate an image of the object.

Next, the processed data is displayed (operation 806) with the process terminating thereafter. This process may be repeated to obtain images of an object in addition to merely locating an object. An example of an image is depicted in display 600 in FIG. 6. In the depicted examples, this process may be performed while the detection unit is moving in a vehicle, such as aircraft 106 or truck 110 in FIG. 1.

Figure 9:
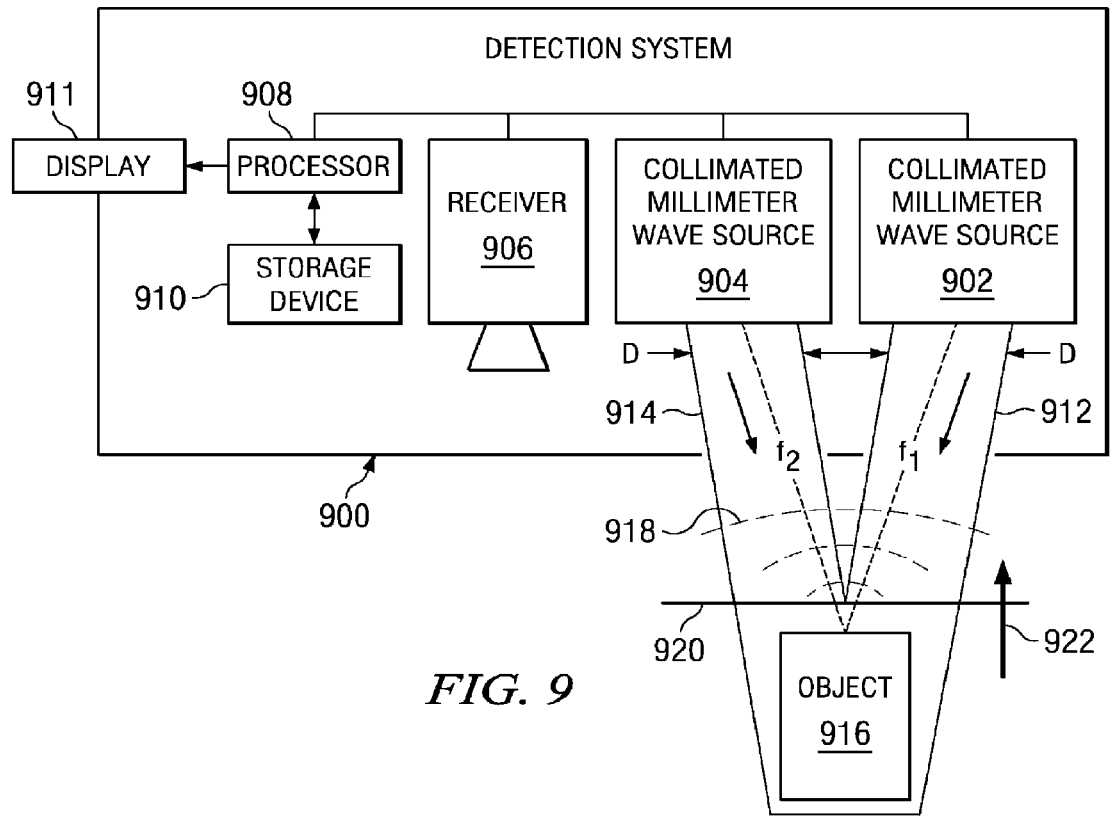
FIG. 9 is a diagram illustrating a detection system in accordance with an advantageous embodiment.

With reference now to FIG. 9, a diagram illustrating a detection system is depicted in accordance with an advantageous embodiment. In this example, detection system 900 is an example of another configuration that may be used in a vehicle.

In this particular example, detection system 900 includes collimated millimeter wave source 902, collimated millimeter wave source 904, and receiver 906. Detection system 900 also includes processor 908, storage device 910, and display 911. This type of implementation may be used for various frequencies such as those, for example, without limitation, from around 75 GHz to around 100 GHz. These components operate in a similar fashion to detection system 400 in FIG. 4.

In this example, collimated millimeter wave source 902 generates beam 912, while collimated millimeter wave source 904 generates beam 914. Beam 912 and beam 914 may be collimated beams. A collimated beam is a beam in which the size remains the same as it propagates. In other words, minimal or no diffraction occurs in the radio frequency pulses making of the beam. Beam 912 has a first frequency F1, while beam 914 has a second frequency F2. Beam 912 and beam 914 are linearly polarized in these examples. These two beams may overlap at or before reaching object 916. This overlap may be total overlap between beam 912 and 914 or a partial overlap.

Receiver 906 may detect response signal 918. Response signal 918, in these examples, is a difference between frequency F1, generated by collimated millimeter wave source 902, and frequency F2, generated by collimated millimeter wave source 904. This frequency is referred to as a difference frequency. Response signal 918 may be processed by processor 908 and may be stored in storage device 910. Further, results from the analysis also may be presented in display 911. In this manner, detection system 900 may be used to identify object 916.

In this example, beam 912 and beam 914 may be high frequency beams. In these illustrative examples, a high frequency beam may have a frequency of around 75 GHz or more. In some advantageous embodiments, high frequency beams may range from around 75 GHz to around 100 GHz. Of course, with other advantageous embodiments, even higher frequencies may be used.

With these implementations, reflections or echoes of downward traveling pulses in beam 912 and beam 914 have no effect on receiver 906. As described above, no effect occurs because receiver 906 may be tuned or controlled to detect the difference in frequencies between beam 912 and beam 914. In these examples, this difference may be an order of magnitude lower in frequency. This type of selection of the difference in frequency beneficially isolates response signal 918 to provide a more easily interpretable standard data in response signal 918.

Isolation of receiver 906 may occur by using line filters installed in front of the first non-linear element of a preamplifier for receiver 906. In another embodiment, mounting of two-dimensional resonant filters in front of the horn for receiver 906 also may be used.

In this advantageous embodiment, detection system 900 may use higher frequency transmitter pulses without blinding receiver circuits in receiver 906. This type of architecture may result in producing higher field strength in the depth at surface 920 or a target, such as object 916.

In these examples, detection system 900 may operate to detect discontinuities versus range or depth of the dielectric constant and the conductivity of the medium such as soil. Additionally, detection system 900 may also detect small changes in the non-linearity of conductivity which may be caused by object 916.

In these examples, detection system 900 receives response signal 918 in a one way path. This path may be from object 916 to the surface and then to receiver 906 as indicated by arrow 922. This path may eliminate various unwanted signals that may occur due to echoes. These echoes may be created by irrelevant straddle of layers within the soil.

Further, detection system 900 may be used in what is termed as shallow depths. These depths may range from around one inch, two inches, 24 inches, 36 inches, 6 feet, 12 feet, and/or other suitable depths. Of course, shallow depths may include other ranges depending on the particular implementation. The use of higher frequencies, such as those from around 75 GHz and upwards, may provide improved spectral resolution. These frequencies may only need to travel in one direction in the manner that the return signal has lower losses due to the lower frequency of the difference between the source frequencies.

In other words, the frequency of response signal 918 is lower than the frequency of beam 912 and beam 914. These beams have higher frequencies than the difference of those frequencies in response signal 918. This lower frequency allows receiver 906 to receive response signal 918 in a manner that has less interference from reflections that may be caused directly by beams 912 and 914 that does not result in the difference between the frequencies in those beams.

In summary, detection system 900 employs collimated beams. These collimated beams are linearly polarized and oriented such that the fields are in the plane of instance for both beams in these examples. Further, these beams are directed towards object 916 such that they strike surface 920 at a Brewster's angle. This angle is an angle at which the polarization is not reflected by the ground.

Typically, when a radio frequency beam moves between two media having different refractive indexes, some of the energy is reflected at the boundary. In this example, the medium may be air and ground with the surface being the boundary. At one particular angle of incidence, a beam with a particular polarization is not reflected. This angle is referred to as the Brewster's angle or a polarization angle. In these examples, the polarization may be one for which the electric field of the beam lies in the same plane as the incident ray and the surface normal. A beam with this type of polarization is referred to as being P-polarized because the beam is parallel to the plane.

Additionally, the collimated beams, beam 912 and beam 914, converge or overlap at object 916 in these examples. Of course, although a complete overlap may be desirable, less overlap also may provide adequate information in response signal 918. In some advantageous embodiments, beam 912 and beam 914 may overlap the different depths at which detection system 900 is interrogating or searching.

Figure 10:
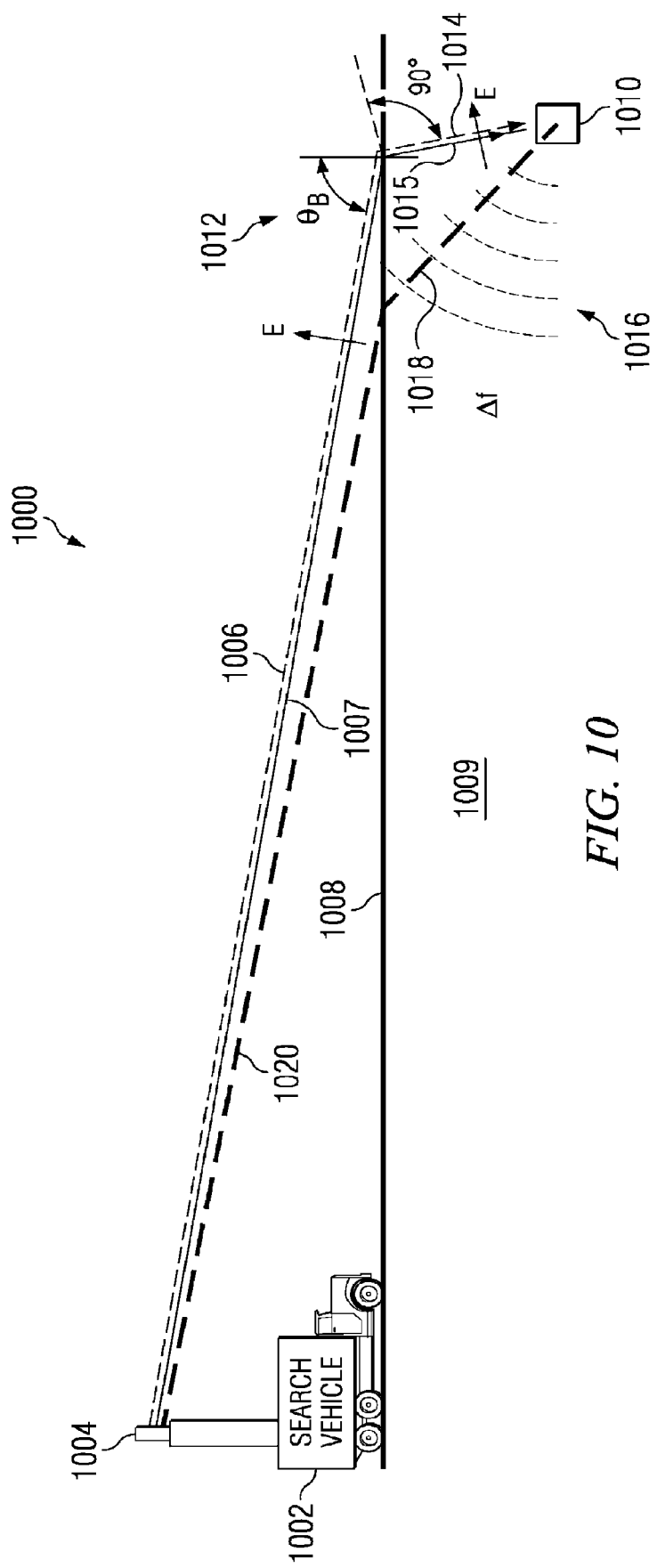
FIG. 10 shows an exemplary target detection system in accordance with an advantageous embodiment.

FIG. 10 shows an exemplary target detection system in accordance with an advantageous embodiment. In this example, target detection system 1000 includes search vehicle 1002 and ground penetrating nonlinear ground radar (GPNR) transceiver 1004 may be implemented using a detection system such as, for example, detection system 900 in FIG. 9.

Ground penetrating nonlinear ground radar transceiver 1004 is configured to emit beam 1006 and beam 1007 at surface 1008 of ground 1009 in proximity to search vehicle 1002. Beam 1006 and beam 1007 are collimated wave beams and more specifically may be collimated millimeter (mm) wave beams in these examples.

Object 1010 may be buried beneath surface 1008 at some depth, typically from between around 2 centimeters to around 2 meters. The depth at which objects may be detected may vary depending on the power used to generate beam 1006 and 1006, ground conditions, the type of soil, the type of object, and other relevant factors. Object 1010 may be an improvised explosive device (IED) or other weapon that includes a detonator with non-linear electronic components, such as, for example, diodes, transistors, or other semiconductor elements.

Beam 1006 and beam 1007 may strike surface 1008 at Brewster's angle $\theta_B$ 1012 to produce refracted beam 1014 and refracted beam 1015 that may interact with nonlinear components in object 1010, causing the nonlinear components to emit difference wave $\Delta f$ 1016 comprising backscattered radiation. Brewster's angle $\theta_B$ 1012 is also referred to as a polarization angle or a Brewster's angle.

Both beam 1006 and beam 1007 are linearly polarized in these examples. This polarization results in these beams passing into ground 1009 and not being reflected when they enter at Brewster's angle $\theta_B$ 1012. In other words, at this angle, most of the energy from beam 1006 and beam 1007 penetrate surface 1008 into ground 1009 to form refracted beam 1014 and refracted beam 1015 to interrogate or reach object 1010.

Portion 1018 of difference wave $\Delta f$ 1016 may be radiated generally towards search vehicle 1002 and subsequently emerge as portion 1020 from surface 1008 at another refraction angle, and may arrive at ground penetrating non-linear ground radar transceiver 1004.

The illustration of FIG. 10 includes a vehicle-based transmitter-receiver being used in an improvised explosive device (IED) search mode. Other search modes are possible, including a hand-held transmitter/receiver carried by a peace officer, soldier, or other user. This illustration is not meant to imply limitations to the manner in which ground penetrating non-linear ground radar transceiver 1004 may be implemented. Of course, this device may be mounted on various vehicles such as an airplane, a helicopter, or some other suitable vehicle. Further, this device may be mounted on a stationery or mobile platform as well as being hand held.

Figure 11:
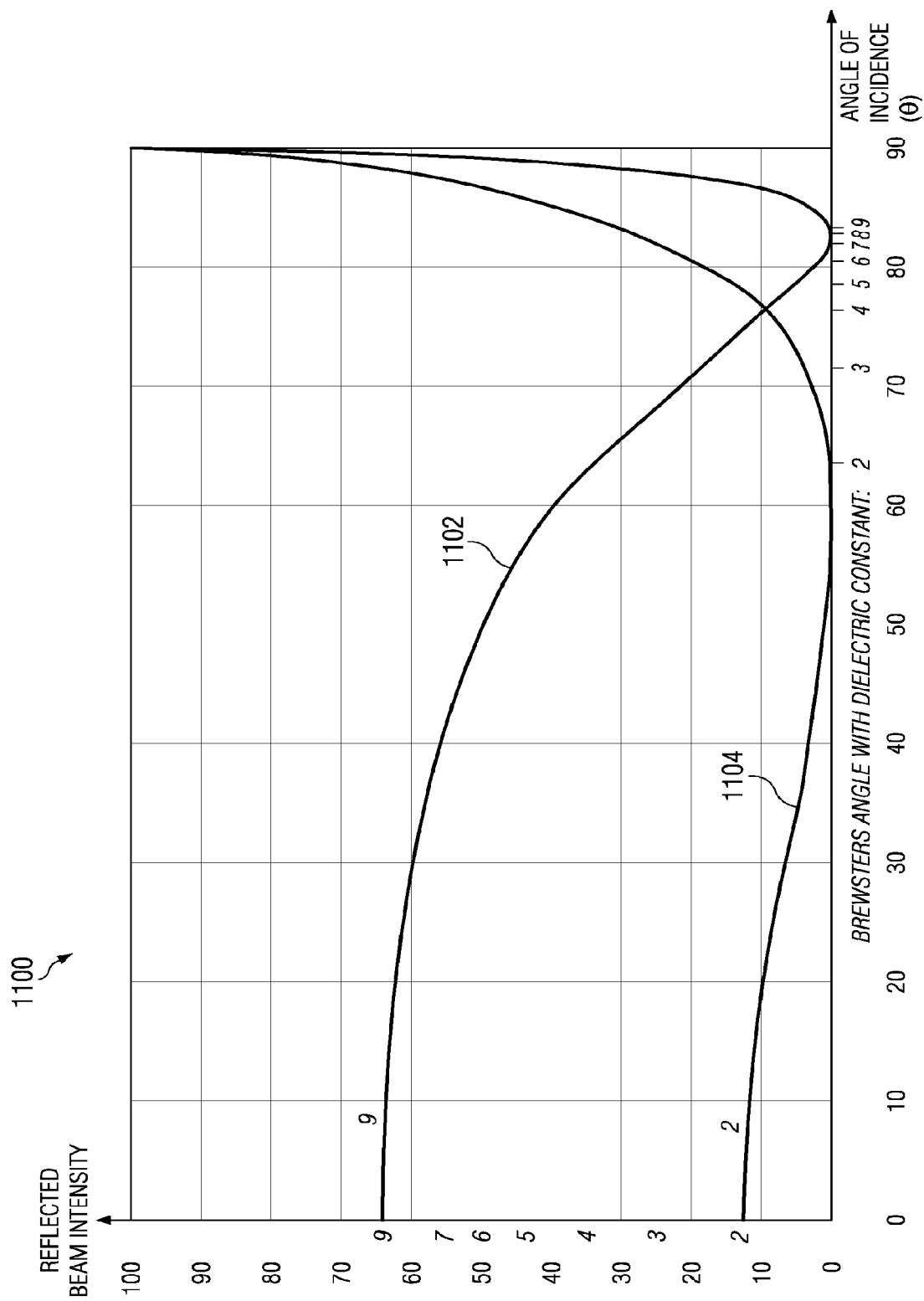
FIG. 11 is a graph showing an intensity of a reflected beam as a function of an angle of incidence (θ) in accordance with an advantageous embodiment.

FIG. 11 is a graph showing an intensity of a reflected beam as a function of an angle of incidence ($\theta$) in accordance with an advantageous embodiment. Graph 1100 includes lines 1102 and 1104. In graph 1100 the x-axis represents an angle of incidence of the electric field in degrees, while the y-axis represents the intensity of the reflection field in percentages.

In this example, the values on x axis and y axis represent the ratio of the permittivity's between two mediums. For example, line 1102 represents a soil/air interface where the soil permittivity is 9 and the air is 1. In other words, line 1102 represents reflected beam intensity with a dielectric constant of 9. This dielectric constant is around the dielectric constant of the ground. As the value of the ratio increases, the intercept on the x-axis moves farther toward 90 degrees. The point on the x-axis where the intercept occurs represents the point of no reflection field and therefore the total internal refraction on the incident field into the second medium. In this example, the second medium is the ground. Line 1104 represents reflected beam intensity for a dielectric constant of 2.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for detecting objects located underground. In one advantageous embodiment, a detection system detects objects having electrical non-linear characteristics located underground. The detection system comprises a transmitter unit, a receiver, and a processor. The transmitter transmits a plurality of pulsed radio frequency signal having a first frequency and a second frequency into a ground.

The receiver monitors for a response signal having a frequency equal to a difference between the first frequency and a second frequency, wherein the response radio frequency signal is generated by an object having non-linear conductive characteristics in response to receiving the plurality of electromagnetic signals. The processor is connected to the transmitter unit and the receiver, wherein the processor controls a selection of the first frequency and the second frequency, wherein the object is detected when the response signal is detected by the receiver. By sweeping through the frequency ranges, additional information about an object buried in the ground may be obtained.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A detection system for detecting objects having electrical non-linear characteristics located underground, the detection system comprising:
    a transmitter unit configured to transmit a first collimated beam having a first radio frequency and a second collimated beam having a second radio frequency into a ground, wherein the first collimated beam and the second collimated beam overlap in the ground;
    a receiver configured to monitor for a response radio frequency signal having a frequency equal to a difference between the first frequency and the second frequency, wherein the response radio frequency signal is generated by an object having non-linear conductive characteristics in response to receiving the first collimated beam and the second collimated beam; and
    a processor configured to control an operation of the transmitter unit and the receiver, wherein the processor is connected to the transmitter unit and the receiver, and wherein the object is detected when the response radio frequency signal is detected by the receiver.

2. The detection system of claim 1, wherein the first collimated beam and the second collimated beam are linearly polarized.

3. The detection system of claim 2, wherein the first collimated beam and the second collimated beam hit a surface of the ground at a Brewster's angle.

4. The detection system of claim 3, wherein the first collimated beam and the second collimated beam overlap each other at the object.

5. The detection system of claim 4, wherein the first collimated beam has a first diameter of at least about 20 times a first wavelength of the first frequency and the second collimated beam has a second diameter of at least about 20 times a second wavelength of the second frequency.

6. The detection system of claim 5, wherein the processor controls the transmitter unit to change the first frequency and the second frequency such that the frequency of the response radio frequency signal changes through a range of frequencies.

7. An apparatus comprising:
    a transmitter unit configured to transmit both a first collimated beam, the first collimated beam being linearly polarized and having a first radio frequency, and a second collimated beam, the second collimated beam being linearly polarized and having a second radio frequency, the first and second collimated beam both penetrating into a surface of a ground at an angle of incidence that eliminates reflection of the first collimated beam, and eliminates reflection of the second collimated beam; and
    a receiver configured to monitor for a radio frequency signal having a frequency equal to a difference between the first frequency and the second frequency in which the frequency is generated by an object having an electrical non-linear conductive characteristic in response to being exposed to the first collimated beam and the second collimated beam, wherein the object is detected when the radio frequency signal is detected by the receiver.

8. The apparatus of claim 7, wherein the first collimated beam and the second collimated beam overlap in the ground.

9. The apparatus of claim 7 further comprising:
    a processor configured to control a selection of the first frequency and the second frequency, wherein the processor is connected to the transmitter unit and the receiver.

10. The apparatus of claim 9, wherein the processor executes instructions to analyze a radio frequency signal received by the receiver to provide an interpretation of the radio frequency signal.

11. The apparatus of claim 7, wherein the first frequency and the second frequency change to change the difference frequency, wherein the difference frequency changes through a range of frequencies.

12. The apparatus of claim 7, wherein the first frequency and the second frequency are selected to cause the first collimated beam and the second collimated beam to penetrate the ground to a selected depth in the ground.

13. The apparatus of claim 7, wherein the object having the electrical non-linear conductive characteristic is a metal with corrosion in portions of the metal.

14. A method of detecting an object with electrical non-linear characteristics, the method comprising:
    transmitting a first collimated beam and a second collimated beam that penetrate into a surface of a ground at an angle of incidence that eliminates reflection of the first collimated beam and the second collimated beam, wherein the first collimated beam is linearly polarized and has a first radio frequency; the second collimated beam is linearly polarized and has a second radio frequency; and wherein the first collimated beam and the second collimated beam overlap each other in the ground;

monitoring for a radio frequency signal having a frequency equal to a difference between the first frequency and the second frequency, wherein the radio frequency signal is generated by an object in the ground having an electrical non-linear characteristic in response to being exposed to the first collimated beam and the second collimated beam; and detecting the object having the electrical non-linear characteristic when the radio frequency signal is detected.

15. The method of claim 14, wherein the angle of incidence is a Brewster's angle.

16. The method of claim 14, wherein the first collimated beam has a first diameter of at least about 20 times a first wavelength of the first frequency and the second collimated beam has a second diameter of at least about 20 times a second wavelength of the second frequency.

17. The method of claim 14, wherein the first frequency and the second frequency are from around 75 gigahertz to around 100 gigahertz.

18. The method of claim 14, wherein the transmitting step comprises:

transmitting the plurality of radio frequency signals having the first frequency and the second frequency into the ground in which the first frequency and the second frequency change to change the difference frequency through a range of frequencies.

19. The method of claim 14, wherein the object having the electrical non-linear characteristic is a metal with corrosion in portions of the metal.

20. The method of claim 14, wherein the object is one of an improvised explosive device, a detonator with non-linear electronic components, a bunker, an electronic instrument control system, a computer, and communication equipment.

* * * * *